US012528970B2

United States Patent
Konno et al.

(10) Patent No.: US 12,528,970 B2
(45) Date of Patent: Jan. 20, 2026

(54) COMPOSITION AND CURED PRODUCT THEREOF

(71) Applicant: DAICEL CORPORATION, Osaka (JP)

(72) Inventors: Takashi Konno, Tokyo (JP); Naritoshi Maetsu, Tokyo (JP); Jun Watanabe, Tokyo (JP); Shintarou Hatanaka, Tokyo (JP)

(73) Assignee: DAICEL CORPORATION, Osaka (JP)

(*) Notice: Subject to any disclaimer, the term of this patent is extended or adjusted under 35 U.S.C. 154(b) by 908 days.

(21) Appl. No.: 17/760,903

(22) PCT Filed: Sep. 8, 2020

(86) PCT No.: PCT/JP2020/033970
§ 371 (c)(1),
(2) Date: Mar. 16, 2022

(87) PCT Pub. No.: WO2021/054201
PCT Pub. Date: Mar. 25, 2021

(65) Prior Publication Data
US 2022/0363942 A1 Nov. 17, 2022

(30) Foreign Application Priority Data
Sep. 17, 2019 (JP) ................. 2019-168878

(51) Int. Cl.
C09D 175/04 (2006.01)
C08G 18/24 (2006.01)
C08G 18/34 (2006.01)
C08G 18/79 (2006.01)
C08J 7/04 (2020.01)
C09D 7/65 (2018.01)

(52) U.S. Cl.
CPC .......... *C09D 175/04* (2013.01); *C08G 18/244* (2013.01); *C08G 18/34* (2013.01); *C08G 18/792* (2013.01); *C08J 7/0427* (2020.01); *C09D 7/65* (2018.01); *C08J 2367/02* (2013.01); *C08J 2475/04* (2013.01)

(58) Field of Classification Search
None
See application file for complete search history.

(56) References Cited

U.S. PATENT DOCUMENTS
2012/0238667 A1   9/2012   Gotou et al.

FOREIGN PATENT DOCUMENTS
JP    4-130119 A       5/1992
JP    2011-137145 A    7/2011
JP    2013-1897 A      1/2013

OTHER PUBLICATIONS

JP 2013 001897 A Eng Translation (Year: 2013).*
International Preliminary Report on Patentability and Written Opinion of the International Searching Authority for International Application No. PCT/JP2020/033970, dated Mar. 15, 2022, with English translation.
International Search Report for International Application No. PCT/JP2020/033970, dated Dec. 8, 2020, with an English translation.
Extended European Search Report dated Sep. 14, 2023 for Application No. 20866209.8.

* cited by examiner

Primary Examiner — Jeffrey D Washville
(74) Attorney, Agent, or Firm — Birch, Stewart, Kolasch & Birch, LLP

(57) ABSTRACT

Provided is a composition capable of forming a cured product excelling in adhesion to a substrate, hardness, scratch resistance, and chemical resistance. The composition of the present disclosure contains a polyol compound (A) and an isocyanate compound (B). The polyol compound (A) includes a compound (a1) represented by Formula (1) below, where $R^1$ to $R^3$ each are a group represented by Formula (1a), the compound (a1) having a number average molecular weight (calibrated with polystyrene standard) of 800 or greater. The isocyanate compound (B) includes a polyisocyanate compound having an isocyanurate skeleton.

12 Claims, No Drawings

COMPOSITION AND CURED PRODUCT THEREOF

TECHNICAL FIELD

The present disclosure relates to a composition for forming a polyurethane resin and a cured product thereof. The present disclosure claims priority to JP 2019-168878 filed in Japan on Sep. 17, 2019, the contents of which are incorporated herein.

Background Art

Polyurethane resins have flexibility, elasticity, and strength. A composition that forms a polyurethane resin having such properties is used, for example, in a coating agent.

As the coating agent, for example, a coating agent used in an application of coating a plastic substrate configuring a component such as a vehicle member or an electronic device is required to form a coating film that exhibits adhesion to the substrate, hardness, and scratch resistance. As such a coating agent, compositions containing an ε-caprolactone modified product of tris(2-hydroxyethyl) isocyanurate and an alicyclic, aliphatic, or aromatic diisocyanate as described in Patent Documents 1 and 2 are known.

However, detachment or deterioration in appearance of a coating film made from a polyurethane resin when a chemical agent such as a sunscreen comes into contact with the coating film has become a problem in recent years.

CITATION LIST

Patent Document

Patent Document 1: JP 2011-137145 A
Patent Document 2: JP 04-130119 A

SUMMARY OF INVENTION

Technical Problem

Accordingly, an object of the present disclosure is to provide a composition capable of forming a cured product excelling in adhesion to a substrate, hardness, scratch resistance, and chemical resistance.

Another object of the present disclosure is to provide a cured product excelling in adhesion to a substrate, hardness, scratch resistance, and chemical resistance.

Another object of the present disclosure is to provide a vehicle member in which at least part of a surface is covered with a cured product excelling in adhesion to a substrate, hardness, scratch resistance, and chemical resistance.

Yet another object of the present disclosure is to provide an enclosure in which at least part of a surface is covered with a cured product excelling in adhesion to a substrate, hardness, scratch resistance, and chemical resistance, and to provide an electronic device provided with the enclosure.

Solution to Problem

As a result of diligent research to solve the problems described above, the present inventors discovered that a polyurethane obtained by reacting a polyol compound having an isocyanurate skeleton with a polyisocyanate compound having an isocyanurate skeleton excels in adhesion to a substrate, hardness, and scratch resistance, and also exhibits excellent chemical resistance. The present inventors also discovered that the hardness and chemical resistance can be further improved by blending a polyester polyol at a specific ratio with the polyol compound. The present disclosure was completed based on these findings.

That is, the present disclosure provides a composition containing a polyol compound (A) and an isocyanate compound (B), wherein the polyol compound (A) includes a compound (a1) represented by Formula (1) below:

[Chem. 1]

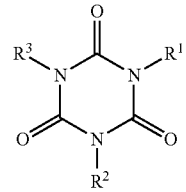

(1)

where $R^1$ to $R^3$ are each, identically or differently, a group represented by Formula (1a) below:

[Chem. 2]

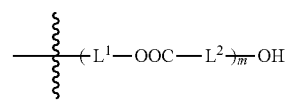

(1a)

where $L^1$ and $L^2$ are each, identically or differently, an alkylene group having from 1 to 10 carbons, m is a number of 0 or greater, and the bond indicated by the wavy line bonds to a nitrogen atom in Formula (1)), provided that "m"s in the groups represented by Formula (1a) in $R^1$, $R^2$, and $R^3$ are not simultaneously 0, and where the compound (a1) has a number average molecular weight (calibrated with polystyrene standard) of 800 or greater, and wherein the isocyanate compound (B) includes a compound (b) represented by Formula (2) below:

[Chem. 3]

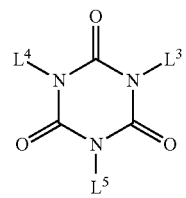

(2)

where $L^3$, $L^4$, and $L^5$ are each, identically or differently, a hydrogen atom, an alkyl group having from 1 to 10 carbons and having an NCO group, or an alkyl group having from 1 to 10 carbons and having a group represented by Formula (2a) below:

[Chem. 4]

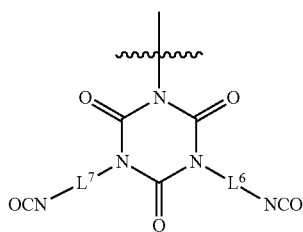

(2a)

where $L^6$ and $L^7$ are each, identically or differently, an alkylene group having from 1 to 10 carbons, and the bond with the wavy line bonds to a carbon atom configuring the alkyl group, provided that $L^3$, $L^4$, and $L^5$ are not simultaneously hydrogen atoms.

The present disclosure provides the above-mentioned composition, wherein the polyol compound (A) further includes a polyester polyol (a2) having a hydroxyl value from 80 to 850 (KOH mg/g) in an amount ranging from 0.1 to 1.5 pans by weight per 1 part by weight of the compound (a1)).

The present disclosure also provides the above-mentioned composition, wherein an equivalent ratio (NCO/OH) of the NCO groups of the isocyanate compound (B) to the OH groups of the polyol compound (A) in the composition is in a range from 0.2 to 2.0.

The present disclosure also provides the above-mentioned composition, further including a polysiloxane derivative (C) in an amount from 0.1 to 0.5 part by weight per 100 parts by weight of the totality of the polyol compound (A) and the isocyanate compound (B).

The present disclosure also provides the above-mentioned composition, further including a solvent represented by Formula (3) below:

[Chem. 5]

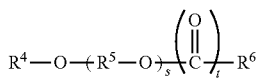

(3)

where $R^4$ and $R^6$ are each, identically or differently, a hydrogen atom or an alkyl group having from 1 to 5 carbons, $R^5$ denotes an alkylene group having from 1 to 5 carbons, s denotes an integer of 1 or greater, t is 0 or 1, and when s is an integer of 2 or greater, $R^5$s may be the same or different.

The present invention also provides the above-mentioned composition, wherein the composition is a coating agent.

The present disclosure also provides a cured product of the composition described above.

The present disclosure also provides a coating film-attached plastic molded article including a plastic molded article and a coating film covering at least part of a surface of the plastic molded article, the coating film including the cured product described above.

Advantageous Effects of Invention

The composition of the present disclosure can form a cured product excelling in adhesion to a substrate, hardness, scratch resistance, and chemical resistance. Therefore, when the composition is used as a coating agent that covers a substrate, a coating film with the above-mentioned characteristics can be formed on the substrate.

A plastic molded article having at least part of the surface covered by a cured product of the composition of the present disclosure, or in other words, a coating film-attached plastic molded article, has high surface hardness and excels in scratch resistance and chemical resistance. Therefore, even when the coating film-attached plastic molded article is touched by a hand on which, for example, a sunscreen agent or the like is adhered, the cured product that covers the surface of the plastic molded article does not detach or become cloudy, and excellent appearance, adherence, hardness, and scratch resistance can be maintained over a long period of time.

DESCRIPTION OF EMBODIMENTS

[Composition]

A composition according to an embodiment of the present disclosure includes a polyol compound (A) and an isocyanate compound (B). The composition may include other components in addition to the components (A) and (B).

(Polyol Compound (A))

The polyol compound (A) is a compound having a plurality of hydroxyl groups. The polyol compound (A) includes at least a compound (a1) represented by Formula (1) below

[Chem. 6]

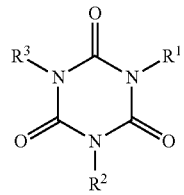

(1)

[where $R^1$ to $R^3$ may be the same or different, d each denote a group represented by Formula (1a) below.

[Chem. 7]

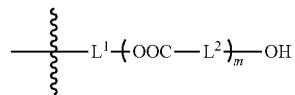

(1a)

(in Formula (1a), $L^1$ and $L^2$ may be the same or different, and each denote an alkylene group having from 1 to 10 carbons, and m is a number of 0 or greater. Furthermore, the bond indicated by the wavy line bonds to a nitrogen atom in Formula (1).) Of course, a case in which m in the group represented by Formula (1a) is 0 simultaneously in $R^1$, $R^2$, and $R^3$ is excluded.]

Examples of the alkylene group having from 1 to 10 carbons of $L^1$ and $L^2$ include linear or branched alkylene groups, such as a methylene group, a methylmethylene group, a dimethylmethylene group, an ethylene group, a propylene group, and a trimethylene group.

Among these, the $L^1$ is preferably an alkylene group having from 1 to 3 carbons.

Also among these, the $L^2$ is preferably an alkylene group having from 3 to 8 carbons, and is particularly preferably an alkylene group having from 4 to 6 carbons. Furthermore, the alkylene group is preferably a linear alkylene group.

The m is an average value of the degree of polymerization of the unit indicated in parentheses in Formula (1a). m is number of 1 or greater, and for example, is a number from 1.0 to 5.0, preferably a number from 1.0 to 3.0, and particularly preferably a number from 1.0 to 2.5.

The number average molecular weight (Mn: calibrated with polystyrene standard) of the compound (a1) is not less than 800, and is preferably not less than 900. The upper limit value of the Mn is, for example, 2000, and in this range, from the perspective of being able to form a cured product having higher hardness and excelling in scratch resistance, the upper limit value is preferably 1500, particularly preferably 1200, and most preferably 1100. The molecular weight dispersity (weight average molecular weight Mw/number average molecular weight Mn) of the compound (a1) is, for example, from 1 to 3.

The hydroxyl value (KOH mg/g) of the compound (a1) is, for example, from 80 to 210 and in this range, the hydroxyl value thereof is preferably from 110 to 190, particularly preferably from 140 to 180, and most preferably from 150 to 175 in that the hardness and chemical resistance of the obtained cured product can be improved.

The compound (a1) can be produced, for example, by subjecting the compound represented by Formula (1') below to ring-opening polymerization of lactone. $L^1$ in Formula (1') below is the same as $L^1$ in Formula (1).

[Chem. 8]

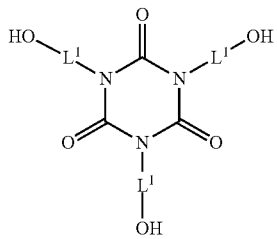

(1')

The polyol compound (A) may contain other polyol compounds in addition to the compound (a1). Examples of other polyols include polyester polyols, polyether polyols, and polycarbonate polyols, other than the compound (a1). One of these can be used alone, or two or more can be used in combination.

Of these, the polyol compound (A) preferably contains, along with the compound (a1), a polyester polyol (=polyester polyol (a2)) other than the compound (a1).

From the perspective of being able to improve the hardness and chemical resistance of the obtained cured product, the total content of the compound (a1) and the polyester polyol (a2) in the polyol compound (A) is preferably, for example, 60 wt. % or more (more preferably 70 wt. % or greater, particularly preferably 80 wt. % or greater, and most preferably 90 wt. % or greater) of the total amount of the polyol compound (A) contained in the composition.

The polyester polyol (a2) is represented by, for example, Formula (4) below

[Chem. 9]

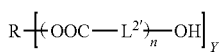

(4)

(In Formula (4), R denotes a hydrocarbon group having a valence of v, where v is an integer of 1 or greater. $L^{2'}$ denotes an alkylene group having from 1 to 10 carbons, and u is a number of 0 or higher. Of course, a case in which all u of a quantity of v are 0 is excluded.)

The v is a integer of 1 or greater, and is, for example, an integer from 1 to 6, preferably an integer from 2 to 6, and particularly preferably an integer of 3 or 4.

The R denotes a hydrocarbon group of a valence v. The hydrocarbon group includes aliphatic hydrocarbon groups, alicyclic hydrocarbon groups, aromatic hydrocarbon groups, and groups obtained by bonding these. Of these, the hydrocarbon group is preferably an aliphatic hydrocarbon group, particularly preferably an aliphatic hydrocarbon group having from 1 to 10 carbons, and especially preferably an aliphatic hydrocarbon group having from 3 to 8 carbons.

Therefore, the R is preferably an aliphatic hydrocarbon group having a valence of v, is particularly preferably an aliphatic hydrocarbon group having a valence of 1 to 6, is even more preferably a trivalent or tetravalent aliphatic hydrocarbon group, and is most preferably a trivalent or tetravalent (saturated) aliphatic hydrocarbon group having from 1 to 10 carbons (and of this range, preferably from 3 to 8 carbons).

Examples of the $L^{2'}$ include the same examples given for $L^2$ in Formula (1a).

Of these examples, the $L^{2'}$ is preferably an alkylene group having from 3 to 8 carbons, and is particularly preferably an alkylene group having from 4 to 6 carbons. Furthermore, the alkylene group is preferably a linear alkylene group.

The u is an average value of the degree of polymerization of the unit indicated in parenthesis in Formula (4). The u is a number of 0 or greater, and, for example, is a number from 0.0 to 5.0, preferably a number from 0.5 to 5.0, more preferably a number from 0.5 to 4.0, particularly preferably a number from 1.0 to 4.0, even more preferably a number from 1.5 to 4.0, and most preferably a number from 1.5 to 3.0.

The number average molecular weight (Mn: calibrated with polystyrene standard) of the polyester polyol (a2) is, for example, from 200 to 2000, and in this range, from the perspective of being able to improve the hardness and chemical resistance of the obtained cured product, the number average molecular weight is preferably from 200 to 1500, more preferably from 200 to 1000, particularly preferably from 200 to 800, even more preferably from 300 to 600, and most preferably from 300 to 500. The molecular weight dispersity (weight average molecular weight Mw/number average molecular weight Mn) of the polyester polyol (a2) is, for example, from 1 to 3.

The hydroxyl value (KOH mg/g) of the polyester polyol (a2) is, for example, from 80 to 850, and in this range, from the perspective of being able to improve the hardness and chemical resistance of the obtained cured product, the hydroxyl value is preferably from 100 to 850, more preferably from 160 to 850, particularly preferably from 280 to 600, even more preferably from 300 to 600, and most preferably from 300 to 570. Note that the hydroxyl value can be measured in accordance with JIS-K1557-1.

From the perspective of being able to improve the hardness and chemical resistance of the obtained cured product, the content of the polyester polyol (a2) is preferably in a range from 0.1 to 1.5 parts by weight, more preferably from 0.3 to 1.2 parts by weight, particularly preferably from 0.5 to 1.2 parts by weight, and most preferably from 0.5 to 1.0 parts by weight, per 1 part by weight of the compound (a1).

Also, from the perspective of being able to improve the hardness and chemical resistance of the obtained cured product, the content of the polyester polyol (a2) is preferably in a range from 0.5 to 5.0 mol, more preferably from 0.8 to 4.0 mol, even more preferably greater than 1.0 mol and 4.0 mol or less, particularly preferably from 1.2 to 4.0 mol, and even more particularly preferably from 2.0 to 4.0 mol, and most preferably from 2.5 to 4.0 mol, per 1 mol of the compound (a1).

The polyester polyol (a2) can be produced, for example, by a method of reacting a polyol and a polyhydric carboxylic acid or an acid anhydride, or a method of subjecting a lactone (ε-caprolactone, δ-valerolactone, γ-butyrolactone, or the like) to a ring-opening polymerization with a polyol.

(Isocyanate Compound (B))

The isocyanate compound (B) includes a compound (b) represented by Formula (2) below:

[Chem. 10]

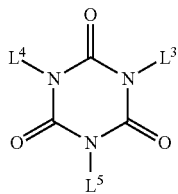

(2)

[where $L^3$, $L^4$, and $L^5$ are each, identically or differently, a hydrogen atom, an alkyl group having from 1 to 10 carbons and having an NCO group, or an alkyl group having from 1 to 10 carbons and having a group represented by Formula (2a) below:

[Chem. 11]

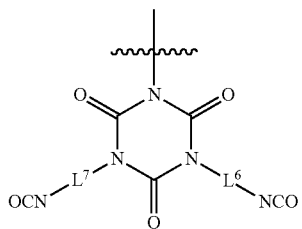

(2a)

(in Formula (2a), $L^6$ and $L^7$ are each, identically or differently, an alkylene group having from 1 to 10 carbons, and the bond indicated by the wavy line bonds to a carbon atom configuring the alkyl group), provided that $L^3$, $L^4$, and $L^5$ are not simultaneously hydrogen atoms].

Examples of the alkyl group having from 1 to 10 carbons include linear or branched alkyl groups, such as a methyl group, an ethyl group, a propyl group, an isopropyl group, a butyl group, an isobutyl group, an s-butyl group, a t-butyl group, a pentyl group, a heptyl group, and octyl group, a 2-ethythexyl group, a nonyl group, and a decyl group. Among these, an alkyl group having a from 1 to 10 carbons is preferable, an alkyl group having from 3 to 8 carbons is particularly preferable, and an alkyl group having from 4 to 8 carbons is most preferable. Furthermore, the alkyl group is preferably a linear alkyl group.

Examples of the alkylene group having from 1 to 10 carbons include the same examples given for $L^2$ in Formula (1a).

Of these examples, the $L^6$ and $L^7$ are each preferably an alkylene group having from 3 to 8 carbon atoms, and are particularly preferably an alkylene group having from 4 to 8 carbons. Furthermore, the alkylene group is preferably a linear alkylene group.

Of the examples of the $L^3$, $L^4$, and $L^5$, an alkyl group having from 1 to 10 carbons (in particular an alkyl group having from 3 to 8 carbons, and more particularly an alkyl group having from 4 to 8 carbons) and having an NCO group and/or a group represented by the Formula (2a) described above is preferred.

As the $L^3$, $L^4$, and $L^5$, above all, an alkyl group having from 1 to 10 carbons and having a NCO group is preferable, an alkyl group having from 3 to 8 carbons and having an NCO group is particularly preferable, and an alkyl group having from 4 to 8 carbons and having an NCO group is most preferable.

The NCO content (NCO wt %) of the compound (h) is, for example, from 17 to 25 wt. %, preferably from 18 to 24 wt. %, and particularly preferably from 19 to 23 wt. %.

The isocyanate compound (B) may contain one or more types of other isocyanate compounds in addition to the compound (b). Examples of the other isocyanate compounds include aliphatic polyisocyanate compounds such as hexamethylene diisocyanate, alicyclic polyisocyanate compounds such as an isophorone diisocyanate, and aromatic polyisocyanate compounds such as 2,4-tolylene diisocyanate.

In particular, from the perspective of being able to improve the hardness and chemical resistance of the obtained cured product, the isocyanate compound (B) preferably contains the compound (h) at an amount of, for example, 60 wt. % or greater (more preferably 70 wt. % or greater, particularly preferably 80 wt. % or greater, and most preferably 90 wt. % or greater) of the total amount of the isocyanate compound (B) contained in the composition.

(Composition)

The composition according to an embodiment of the present disclosure includes a polyol compound (A) and an isocyanate compound (B), and from the perspective of being able to improve the hardness and chemical resistance of the obtained cured product, the contents of these compounds (A) and (B) are preferably such that an equivalent ratio (NCO/OH) of the NCO groups of the isocyanate compound (B) to the OH groups of the polyol compound (A) is in a range from 0.2 to 2.0, more preferably a range from 0.5 to 1.5, and particularly preferably in a range from 0.9 to 12.

In addition to the above-mentioned components, the composition may contain one or more types of additives selected from, for example, surfactants, anti-foaming agents, surface modifiers, solvents, inorganic particles, viscoelastic modifiers, wetting agents, dispersing agents, preservatives, film forming agents, plasticizers, osmotic agents, perfumes, bactericides, anti-mold agent, ultraviolet light absorber, antioxidants, anti-static agents, flame retardants, dyes, pigments, light stabilizers, thixotropic agents, matting agents, and urethane beads.

Examples of the inorganic particles include silica, alumina, mica, synthetic mica, talc, calcium oxide, calcium carbonate, zirconium oxide, titanium oxide, barium titanate, kaolin, bentonite, diatomaceous earth, boron nitride, aluminum nitride, silicon carbide, zinc oxide, cerium oxide, cesium oxide, magnesium oxide, glass beads, glass fiber, graphite, carbon nanotubes, calcium hydroxide, magnesium hydroxide, and aluminum hydroxide. One of these can be used alone, or two or more can be used in combination. Among these, silica is preferable from the perspective of being able to improve the chemical resistance and scratch resistance of the obtained cured product.

The particle size of the inorganic particles is not particularly limited, but is preferably, for example, from 0.01 mu to 1 μm from the perspective of obtaining a good appearance.

The composition preferably contains a surface modifier from the perspective of being able to smooth the coating film surface. Examples of the surface modifier include polysiloxane derivatives (C).

Examples of the polysiloxane derivative (C) include compounds having a polydimethylsiloxane skeleton. Among these, polyether-modified polydimethylsiloxane is preferable, and polyethylene oxide (or polypropylene oxide)-added polydimethylsiloxane is particularly preferable.

The content of the polysiloxane derivative (C) is, for example, from 0.1 to 0.5 part by weight per 100 parts by weight of the total of the polyol compound (A) and the isocyanate compound (B).

A solvent can also be added to the composition to adjust the viscosity. The solvent is, for example, represented by Formula (3) below.

[Chem. 12]

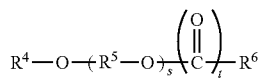

(3)

where $R^4$ and $R^6$ are each, identically or differently, a hydrogen atom or an alkyl having from 1 to 5 carbons, and $R^5$ denotes an alkylene group having from 1 to 5 carbons. Furthermore, s denotes an integer of 1 or greater, t is 0 or 1, and when s is an integer of 2 or greater, $R^5$s may the same or different.

Examples of the alkyl group having from 1 to 5 carbons of $R^4$ and $R^6$ include linear or branched alkyl groups, such as a methyl group, an ethyl group, a propyl group, an isopropyl group, a butyl group, an isobutyl group, an s-butyl group, a t-butyl group, and a pentyl group.

Examples of the alkylene group having from 1 to 5 carbons of $R^5$ include the same examples given for $L^2$ in Formula (1a).

Examples of the solvent represented by Formula (3) include mono or poly(oxy $C_{1-6}$alkylene) glycols, such as ethylene glycol, propylene glycol, butylene glycol, 1,3-butanediol, 1,4-butanediol, 1,6-hexanediol, diethylene glycol, and triethylene glycol; mono or poly(oxy alkylene) glycol mono($C_{1-4}$ alkyl ethers), such as ethylene glycol monomethyl ether, diethylene glycol monomethyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, and dipropylene glycol monobutyl ether; mono or poly(oxy $C_{1-6}$ alkylene) glycol di($C_{1-4}$ alkyl ethers), such as ethylene glycol dimethyl ether, diethylene glycol dimethyl ether, propylene glycol dimethyl ether, propylene glycol methylethyl ether, propylene glycol methylpropyl ether, propylene glycol methylbutyl ether, dipropylene glycol dimethyl ether, dipropylene glycol methylethyl ether, dipropylene glycol methylpropyl ether, and dipropylene glycol methylbutyl ether; and mono or poly(oxy $C_{1-6}$ alkylene) glycol mono($C_{1-4}$ alkyl ether) mono($C_{1-4}$ alkyl esters), such as ethylene glycol monoethyl ether acetate, ethylene glycol monopropyl ether acetate, ethylene glycol monobutyl ether acetate, diethylene glycol monomethyl ether acetate, diethylene glycol monobutyl ether acetate, propylene glycol monomethyl ether acetate, propylene glycol monoethyl ether acetate, dipropylene glycol monomethyl ether acetate, dipropylene glycol monoethyl ether acetate, and 3-methoxybutanol acetate. One of these can be used alone or two or more in combination.

As the solvent represented by Formula (3), the mono or poly(oxy $C_{1-6}$ alkylene) glycol mono($C_{1-4}$ alkyl ether) mono ($C_{1-4}$ alkyl esters) are preferable, and mono or polyoxyethylene) glycol monoethyl ether monoacetate is particularly preferable.

In addition to the solvent represented by Formula (3) above, one or more other solvents may be used in the composition. Examples of other solvents include esters such as butyl acetate and ethyl acetate; ethers such as dioxane and tetrahydrofuran; ketones such as acetone; aromatic hydrocarbons such as toluene and xylene; halogenated hydrocarbons such as dichloromethane and chloroform; monohydric alcohols such as methanol, ethanol, isopropanol, and butanol, and nitrites such as acetonitrile and benzonitrile.

The content of the solvent (preferably, the solvent represented by Formula (3)) in the composition is in a range at which the solid content concentration in the composition is, for example, from 70 to 95 wt. % (preferably, from 80 to 95 wt. %). The content of the solvent is, for example, from 5 to 20 parts by weight, preferably from 7 to 17 parts by weight, and particularly preferably from 9 to 15 parts by weight, per 100 parts by weight of the total of the polyol compound (A) and the isocyanate compound (B).

The composition can be produced by mixing the above-mentioned components. Note that when the composition is used as a coating agent, the composition is preferably used as a two-pack type coating agent, and preferably, the polyol compound (A) and the isocyanate compound (B) are separately stored, and then mixed when used.

Since the composition has the configuration described above, the polyol compound (A) and the isocyanate compound (B) are urethane bonded when the composition is subjected to a heating treatment, and thereby a cured product (a cured product made from a polyurethane resin) can be formed.

The heating treatment conditions include, for example, heating at a temperature of from 100 to 150° C. for approximately 0.5 to 12 hours. After the heating treatment has been completed, the heat-treated composition may be further aged for 12 to 60 hours at room temperature (from 1 to 30° C.).

The cured product thus obtained excels in adhesion to a substrate (for example, a plastic substrate such as PET) and scratch resistance.

The cured product also has high hardness, and the pencil hardness (measured by a method in accordance with JIS K5600) is, fir example, HB or harder, preferably F or harder, particularly preferably H or harder, and even more preferably 2H or harder. Furthermore, the Martens hardness of the cured product (determined by an indentation test in accordance with ISO 14577; in N/mm²) is, for example, greater than 5.0 and 15.0 or less, and preferably from 5.5 to 13.0.

The cured product excels in chemical resistance, and, for example, even when a sunscreen agent is adhered thereto, the surface of the cured product does not swell or become cloudy. That is, the cured product exhibits excellent sunscreen resistance.

The cured product possesses a combination of the above-mentioned characteristics. Therefore, the composition forming the cured product is suitable as a coating agent for a plastic molded article, a film material, and a molding material. Note that examples of the plastic molded article include an enclosure of a home appliance (refrigerator, washing machine, air conditioner, television, or the like), an enclosure of an electronic device (personal computer, mobile phone, smartphone, or the like), a member configuring a musical instrument (piano, electric organ, an electronic musical instrument, or the like), a vehicle member (an interior material such as an instrument panel a door panel, a head lining, or a tonneau cover, or an exterior material such as a bumper) for an automobile, a railway vehicle, and the like.

Furthermore, examples of the plastic for forming a plastic molded article include a thermoplastic resin and a thermosetting resin.

Examples of the thermoplastic resin include polyolefin-based resins such as polyethylene and polypropylene; styrene-based resins such as polystyrene; polyesters such as polyethylene terephthalate (PET); vinyl chloride-based resins such as vinyl chloride resin; polyamides such as polyamide 46, polyamide 6, polyamide 66, polyamide 610, polyamide 612, polyamide 1010, polyamide 1012, polyamide 11, polyamide 12, and polyamide 1212; polyphenylene, ethers such as poly(2,6-dimethyl-1,4-phenylene ether); polymers or copolymers of acrylonitrile such as PAN resin, AS resin, ABS resin, AAS resin, ACS resin, AES resin, and AXS resin; (meth)acrylic resin, polycarbonate, polyacetal, polyphenylene sulfide, polyether ether ketone, polyamide imide, polyimide, polyether imide, polysulfone, polyether sulfone, modified products and derivatives of these resins, and polymer blends and polymer alloys containing these resins.

Examples of the thermosetting resin include phenolic resins, urea resins, melamine resins, unsaturated polyesters, furan resins, epoxy resins, polyurethanes, allyl resins, and polyimides.

[Coating Film-Attached Plastic Molded Article]

The coating film-attached plastic molded article according to an embodiment of the present disclosure has a configuration in which a coating film formed from a cured product of the composition covers at least part of a surface of a plastic molded article.

The thickness of the coating film is not particularly limited, and can be selected, as appropriate, in a range, for example, from 20 to 150 μm, depending on the application.

Examples of the coating film-attached plastic molded article include the same examples as those described above. The coating film-attached plastic molded article is provided with a coating film formed from the cured product described above, and thus has high surface hardness and excels in scratch resistance and chemical resistance. Furthermore, even when the coating film-attached plastic molded article is touched by a hand on which, for example, a sunscreen agent is adhered, the cured product that covers the surface of the plastic molded article does not detach or become cloudy, and excellent appearance, adhesion, hardness, and scratch resistance can be maintained over a long period of time.

Each of the configurations, combinations thereof, and the like according to the present disclosure is an example, and various additions, omissions, substitutions, and changes may be made as appropriate without departing from the gist of the present disclosure. Further, the present disclosure is not limited by the embodiments and is limited only by the claims.

EXAMPLES

Hereinafter, the present disclosure will be described more specifically with reference to examples, but the present disclosure is not limited by these examples.

Synthesis Example 1

Tris(2-hydroxyethyl) isocyanurate (783.6 g), ε-caprolactone (CLM) (2216.4 g) and stannous octoate (5 ppm) were inserted into a 5-neck flask under a nitrogen atmosphere, after which the temperature was increased to 170° C., and the mixture was subjected to a polymerization reaction. After the concentration of the residual CLM was confirmed through gas chromatography to be less than 1.0%, the reaction mixture was cooled. Through this, a compound (a1-1) (Mw/Mn=1.3, Mn=1068, viscosity of 4.4 [Pa·s/25° C.], hydroxyl value of 169.2 [KOH mg/g]) was obtained.

Synthesis Example 2

A compound (a1-2) (Mw/Mn 1.5, Mn=1241, viscosity of 3.7 [Pa·s/25° C.], hydroxyl value of 135.1 [KOH mg/g]) was obtained in the same manner as in Synthesis Example 1 with the exception of using tris(2-hydroxyethyl) isocyanurate (209.0 g), CLM (791.0 g), and stannous octoate (5 ppm).

Note that in the measurement of the molecular weight distribution of the obtained compounds, a high-speed GPC instrument was used, the number average molecular weight (Mn) and the weight average molecular weight (Mw) were determined through comparison with a polystyrene standard, and the molecular weight dispersity (Mw/Mn) was calculated.

The measurement conditions were as follows.
Measurement instrument: "HLC-8220GPC" high-speed GPC instrument, available from Tosoh Corporation
Mobile phase: tetrahydrofuran Example 1

A 50 mL glass container was charged with a polyol compound, an isocyanate compound, a surface modifier, and a solvent as described in the following table, and the components were mixed, and the mixture was defoamed. A composition was obtained as a result.

An applicator was used to apply the obtained composition onto a PET film (Cosmoshine A4100, #100, available from Toyobo Co., Ltd.) in an amount resulting in a film thickness of 90 μm, and the coated PET film was then heated in an oven at 120° C. for 2 hours to cure and dry the coating film. Subsequently, the coated. PET film was further cured for 48 hours in a constant temperature, constant humidity environment at 23° C., 50% RH, and a cured coating film/PET film laminate was obtained.

Examples 2 to 4 and Comparative Examples 1 to 3

Compositions were obtained in the same manner as in Example 1 with the exception that the formulations of the compositions were changed as described in Table 1, and cured coating film/PET film laminates were obtained.

The pencil hardness, Martens hardness, scratch resistance, and sunscreen resistance of the cured coating films of the laminates obtained in the examples and comparative examples were evaluated by the following methods.

(Pencil Hardness)

The pencil hardness of the surface of the cured film side of each laminate obtained in the examples and comparative examples was evaluated in accordance with JIS K5600-5-4.

Namely, the cured coating film surface of the laminate was rubbed with a pencil (load: 750 g, angle: 45°), and those laminates for which scratches could be confirmed on the surface were determined to be NG (defective). Specifically, first, an evaluation was conducted using a pencil of a certain hardness, and if no scratches occurred, the evaluation was repeated using a pencil of a hardness of one level higher, and this operation was repeated until scratches were confirmed. Once scratches were confirmed, the pencil hardness of the laminate was re-evaluated at the pencil hardness one level lower than the pencil hardness at which scratches occurred. If no scratches could be confirmed, once again a pencil of a hardness one level higher was used, and if reproducibility of scratches of two or more times was confirmed, the hardness of the hardest pencil at which scratches did not occur was used as the pencil hardness of the cured coating film thereof. The evaluation results were expressed in terms of the hardness of the pencil lead.

Pencils for evaluation: "pencils for pencil hardness test", available from Mitsubishi Pencil Co., Ltd.
Load: 750 gf
Scratch distance: 7 mm or longer
Scratch angle: 45°
Measurement environment: 23° C., 50% RH Note that the laminates used for the test were laminates whose moisture was adjusted for 24 hours in a constant temperature and constant humidity chamber at 23° C. and 50% RH.

(Martens Hardness)

The Martens hardness of the surface of the cured film side of each laminate obtained in the examples and the comparative examples was measured using the Shimadzu Dynamic Ultrafine Hardness Tester DUH-211 (available from Shimadzu Corporation). Martens hardness is a value determined by the quotient of a test load and a surface area in which an indenter has penetrated, and serves as an index of surface hardness.

(Scratch Resistance)

The surface of the cured coating film side of each laminate obtained in the examples and comparative examples was subjected to a rubbing test in which steel wool (B-204 Bonstar #0000 for business use) was attached to a rubbing tester (standard model (available from Nippon Rika Industries Corporation)), and the steel wool was moved back and forth (10 reciprocations or 20 reciprocations) with a load of 500 g applied. The initial gloss (gloss at 60 degrees) ($G_0$) of the surface of the cured coating film side before the test and the gloss (gloss at 60 degrees) ($G_1$) after two minutes of the test were measured.

The gloss retention percentage was calculated from the following equation, and the scratch resistance was evaluated by the following criteria.

Gloss Retention Percentage=$(G_1)/(G_0) \times 100$

Note that the gloss was measured using a gloss meter (Gloss Meter VG7000 (available from Nippon Denshoku Industries Co., Ltd.)).

(Evaluation Criteria)
Excellent: Gloss retention percentage of 90% or higher
Good: Gloss retention percentage from 80% to less than 90%
Marginal: Gloss retention percentage of less than 80%

Poor: The cured coating film was scraped during the rubbing test, making it impossible to implement a scratch resistance test.

(Scratch Recovery)

The laminates obtained in the examples and comparative examples were also subjected to a rubbing test similar to that of the (scratch resistance) test, and then left standing in a constant temperature, constant humidity environment at 23° C., 50% RH for 24 hours.

The initial gloss (gloss at 60 degrees) ($G_0$) of the surface of the cured coating film side before the test and the gloss (gloss at 60 degrees) ($G_2$) after left standing for 24 hours after testing were measured.

The gloss retention percentage after standing was calculated from the following equation, and the scratch resistance was evaluated by the evaluation criteria.

Gloss Retention Percentage After Standing=$(G_2)/(G_0) \times 100$ (Sunscreen Resistance (Immersion Method))

The entire surface of the cured coating film side of a test piece [rectangular, 2 $cm^2$] of each laminate obtained in the examples and comparative examples was brought into contact with 0.4 g of a sunscreen cream (Neutrogena Ultra Sheer Dry-Touch Sunblock SPF45) weighed on a slide glass (contact amount of sunscreen cream with the cured coating film: 0.1 $g/cm^2$).

The entire cured coating film was covered with a PVDC film and allowed to stand in an oven at 80° C. for 5 hours, and then the sunscreen cream was wiped off, and the sunscreen resistance was evaluated by the following criteria from the adhesion state of the cured coating film.

(Evaluation Criteria)
Good: The cured coating film did not detach.
Marginal: A portion of the cured coating film detached.
Poor: The cured coating film completely detached.

After the sunscreen resistance test, each test piece was left on a flat surface with the surface of the cured coating film side in contact with the flat surface. The height [mm] of the four corners of the test piece from the flat surface was then measured. The total value [mm] of the heights of the four corners of the test piece was taken as the curl, and the sunscreen resistance was evaluated from the magnitude of the curl. Note that a smaller magnitude of curl indicates more excellent sunscreen resistance.

(Sunscreen Resistance (Drip Method))

The surface of the cured coating film side of each laminate obtained in the examples and comparative examples was coated with a sunscreen cream (Neutrogena Ultra Sheer Dry-Touch Sunblock SPF45) in an amount of 0.025 $g/cm^2$, and then left in an oven at 50° C. for 1 hour.

After testing, the sunscreen cream was wiped off, the appearance of the cured coating film was visually observed, and the sunscreen resistance was evaluated by the following criteria.

(Evaluation Criteria)
Excellent: Almost no change in the appearance of the cured coating film.
Good: Traces of chemical liquid remained on the cured coating film.
Marginal: The cured coating film swelled.
Poor: The cured coating film swelled and whitened.

The results are summarized and shown in the tables below

TABLE 1

| | | Example 1 | Example 2 | Example 3 | Example 4 | Comparative Example 1 | Comparative Example 2 | Comparative Example 3 |
|---|---|---|---|---|---|---|---|---|
| Polyol | a1-1 | 54.8 | — | 34.7 | 19.2 | — | — | — |
| | a1-2 | — | 59.5 | — | — | — | — | — |
| | 1 | — | — | — | — | 52.6 | — | — |
| | 2 | — | — | — | — | — | 59.5 | — |
| | a2-1 | — | — | 10.8 | 19.2 | — | — | 29.5 |
| Isocyanate compound | | 34.9 | 30.2 | 44.2 | 51.4 | 37.2 | 30.2 | 60.3 |
| NCO/OH | | 1.05 | 1.05 | 1.05 | 1.05 | 1.05 | 1.05 | 1.05 |
| Surface modifier | | 0.3 | 0.3 | 0.3 | 0.3 | 0.3 | 0.3 | 0.3 |
| Solvent | | 10 | 10 | 10 | 10 | 10 | 10 | 10 |
| Solid content concentration [%] | | 90 | 90 | 90 | 90 | 90 | 90 | 90 |
| Pencil Hardness | | H | F | 3H | 4H | H | H | — |
| Martens hardness [N/mm$^2$] | | 5.5 | 5.3 | 5.8 | 11.8 | 5.5 | 5 | 191.7 |
| Scratch resistance load 500 g × 10 reciprocations | 2 minutes after testing | Excellent | Excellent | Excellent | Excellent | Excellent | Good | Good |
| | 24 hours after testing | Excellent | Excellent | Excellent | Excellent | Excellent | Good | Excellent |
| Scratch resistance load 500 g × 20 reciprocations | 2 minutes after testing | Excellent | Poor | Excellent | Excellent | Good | Poor | Good |
| | 24 hours after testing | Excellent | Poor | Excellent | Excellent | Good | Poor | Good |
| Sunscreen resistance (immersion method) | Adhesion | Good | Good | Good | Good | Poor | Poor | Good |
| | Curl [mm] | 14.4 | 14.5 | 4.6 | 6.3 | — | — | 8.4 |
| Sunscreen resistance (drip method) | Appearance | Good | Good | Good | Excellent | Good | Good | Excellent | a1-1: Compound (a1-1) obtained in Synthesis Example 1
a1-2: Compound (a1-2) obtained in Synthesis Example 2
1: Placcel 309 (available from Daicel Corporation), polycaprolactone triol, Mn = 987, Mw/Mn = 1.5
2: Placcel 312 (available from Daicel Corporation), polycaprolactone triol, Mn = 1335, Mw/Mn = 1.6
a2-1: Placcel 303 (available from Daicel Corporation), polycaprolactone triol, hydroxyl value 543.6 [KOH mg/g], Mn = 400, Mw/Mn = 1.2
(* Mn and Mw/Mn are converted values determined by GPC and calibrated with polystyrene standard.)
Isocyanate compound: Trimer of hexamethylene diisocyanate, NCO content: 20.9 wt. %, Takenate D-170N (available from Mitsui Chemicals, Inc.)
Surface modifier: Ether-modified polydimethylsiloxane, BYK-306 (available from BYK Japan KK)
Solvent: Diethylene glycol monoethyl ether acetate, reagent available from Tokyo Chemical Industry Co., Ltd.

As a summary of the above, configurations and variations of the present disclosure are described below.

[1] A composition containing a polyol compound (A) and an isocyanate compound (B), wherein the polyol compound (A) contains a compound (a1) represented by Formula (1) and having a number average molecular weight (calibrated with polystyrene standard) of 800 or greater, and the isocyanate compound (B) contains a compound (b) represented by Formula (2).

[2] The composition according to [1], wherein the hydroxyl value of the compound (a1) is from 80 to 210 (KOH mg/g).

[3] The composition according to [1] or [2], wherein the NCO content of compound (b) is from 17 to 25 wt. %.

[4] The composition according to any one of [1] to [3], wherein the polyol compound (A) further contains a polyester polyol (a2) having a hydroxyl value of 80 to 850 (KOH mg/g) in an amount ranging from 0.1 to 1.5 parts by weight per 1 part by weight of the compound (a1).

[5] The composition according to [4], wherein a total content of the compound (a1) and the polyester polyol (a2) is 60 wt. % or greater of the total amount of the polyol compound (A) contained in the composition.

[6] The composition according to any one of [1] to [5], wherein the content of the compound (b) is 60 wt. % or greater of the total amount of the isocyanate compound (B) contained in the composition.

[7] The composition according to any one of [1] to [6], wherein an equivalent ratio (NCO/OH) of the NCO groups of the isocyanate compound (B) to the OH groups of the polyol compound (A) is in a range from 0.2 to 2.0.

[8] The composition according to any one of [1] to [7], further containing from 0.1 to 0.5 part by weight of a polysiloxane derivative (C) per 100 parts by weight of the totality of the polyol compound (A) and the isocyanate compound (B).

[9] The composition according to any one of [1] to [8], further containing a solvent represented by Formula (3).

[10] The composition according to any one of [1] to [9], wherein the composition is a coating agent.

[11] A cured product of the composition described in any one of to [1] to [10].

[12] A coating film-attached plastic molded article having a coating film covering at least part of a surface of a plastic molded article, the coating film being formed from the cured product described in [11].

[13] A method for manufacturing a coating film-attached plastic molded article, the method including coating the surface of a plastic molded article with the composition described in any one of [1] to [10], thereby manufacturing a coating film-attached plastic molded article in which at least part of the surface of the plastic molded article is covered with a coating film formed from a cured product of the composition.

INDUSTRIAL APPLICABILITY

The composition of the present disclosure can form a cured product excelling in adhesion to a substrate, hardness, scratch resistance, and chemical resistance. Thus, the composition is useful as a coating agent that covers a substrate.

The invention claimed is:

1. A composition comprising:

a polyol compound (A); and an isocyanate compound (B), wherein the polyol compound (A) comprises a compound (a1) represented by Formula (1):

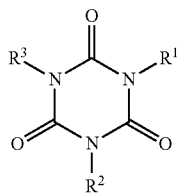
(1)

wherein R¹ to R³ are each, identically or differently, a group represented by Formula (1a):

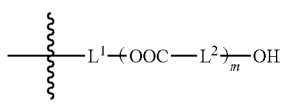
(1a)

wherein L¹ and L² are each, identically or differently, an alkylene group having from 1 to 10 carbons, m is a number of 0 or greater, and the bond with the wavy line bonds to a nitrogen atom in Formula (1), provided that "m"s in the groups represented by Formula (1a) in R¹, R², and R³ are not simultaneously 0, and wherein the compound (a1) has a number average molecular weight, calibrated with polystyrene standard, of 800 or greater, and wherein the isocyanate compound (B) comprises a compound (b) represented by Formula (2):

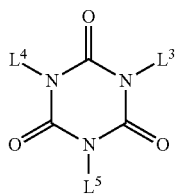
(2)

wherein L³, L⁴, and L⁵ are each, identically or differently, a hydrogen atom, an alkyl group having from 1 to 10 carbons and having an NCO group, or an alkyl group having from 1 to 10 carbons and having a group represented by Formula (2a):

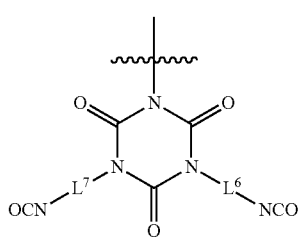
(2a)

wherein L⁶ and L⁷ are each, identically or differently, an alkylene group having from 1 to 10 carbons, and the bond with the wavy line bonds to a carbon atom configuring the alkyl group, provided that L³, L⁴, and L⁵ are not simultaneously hydrogen atoms, wherein a hydroxyl value of the compound (a1) is from 140 to 210 (KOH mg/g), and wherein the polyol compound (A) further comprises a polyester polyol (a2) having a number average molecular weight, calibrated with polystyrene standard, from 200 to 600, and a hydroxyl value from 300 to 850 (KOH mg/g), and in an amount ranging from 0.5 to 1.5 parts by weight per 1 part by weight of the compound (a1).

2. The composition according to claim 1, wherein an equivalent ratio (NCO/OH) of the NCO groups of the isocyanate compound (B) to the OH groups of the polyol compound (A) in the composition is in a range from 0.2 to 2.0.

3. The composition according to claim 1, further comprising a polysiloxane derivative (C) in an amount from 0.1 to 0.5 part by weight per 100 parts by weight of the totality of the polyol compound (A) and the isocyanate compound (B).

4. The composition according to claim 1, further comprising a solvent represented by Formula (3):

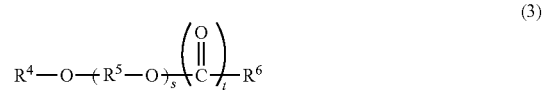
(3)

wherein R⁴ and R⁶ are each, identically or differently, a hydrogen atom or an alkyl group having from 1 to 5 carbons, R⁵ denotes an alkylene group having from 1 to 5 carbons, s denotes an integer of 1 or greater, t is 0 or 1, and when s is an integer of 2 or greater, R⁵s may be the same or different.

5. The composition according to claim 1, wherein the composition is a coating agent.

6. A cured product of the composition described in claim 1.

7. A coating film-attached plastic molded article comprising:
a plastic molded article; and
a coating film covering at least part of a surface of the plastic molded article, the coating film comprising the cured product described in claim 6.

8. The composition according to claim 1, wherein the NCO content of compound (b) is from 17 to 25 wt. %.

9. The composition according to claim 1, wherein a total content of the compound (a1) and the polyester polyol (a2) is 60 wt. % or greater of the total amount of the polyol compound (A) contained in the composition.

10. The composition according to claim 1, wherein the content of the compound (b) is 60 wt. % or greater of the total amount of the isocyanate compound (B) contained in the composition.

11. A method for manufacturing a coating agent, the method including mixing a polyol compound (A); and
an isocyanate compound (B),
wherein the polyol compound (A) comprises a compound (a1) represented by Formula (1):

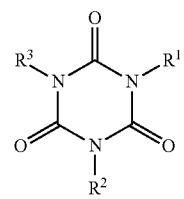
(1)

wherein $R^1$ to $R^3$ are each, identically or differently, a group represented by Formula (1a):

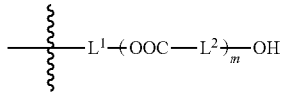
(1a)

wherein $L^1$ and $L^2$ are each, identically or differently, an alkylene group having from 1 to 10 carbons, m is a number of 0 or greater, and the bond with the wavy line bonds to a nitrogen atom in Formula (1), provided that "m"s in the groups represented by Formula (1a) in $R^1$, $R^2$, and $R^3$ are not simultaneously 0, and wherein the compound (a1) has a number average molecular weight, calibrated with polystyrene standard, of 800 or greater, and wherein the isocyanate compound (B) comprises a compound (b) represented by Formula (2):

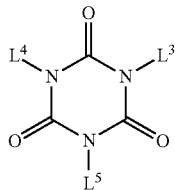
(2)

wherein $L^3$, $L^4$, and $L^5$ are each, identically or differently, a hydrogen atom, an alkyl group having from 1 to 10 carbons and having an NCO group, or an alkyl group having from 1 to 10 carbons and having a group represented by Formula (2a):

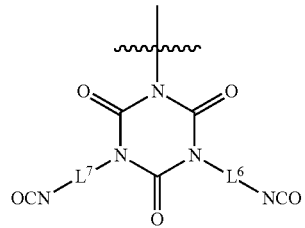
(2a)

wherein $L^6$ and $L^7$ are each, identically or differently, an alkylene group having from 1 to 10 carbons, and the bond with the wavy line bonds to a carbon atom configuring the alkyl group, provided that $L^3$, $L^4$, and $L^5$ are not simultaneously hydrogen atoms, wherein a hydroxyl value of the compound (a1) is from 140 to 210 (KOH mg/g), and wherein the polyol compound (A) further comprises a polyester polyol (a2) having a number average molecular weight, calibrated with polystyrene standard, from 200 to 600, and a hydroxyl value from 300 to 850 (KOH mg/g), and in an amount ranging from 0.5 to 1.5 parts by weight per 1 part by weight of the compound (a1).

12. A method for manufacturing a coating film-attached plastic molded article, the method including coating the surface of a plastic molded article with the composition described in claim 1, thereby manufacturing a coating film-attached plastic molded article in which at least part of the surface of the plastic molded article is covered with a coating film formed from a cured product of the composition.

\* \* \* \* \*